US012089007B2

(12) United States Patent
Michaelsen

(10) Patent No.: US 12,089,007 B2
(45) Date of Patent: Sep. 10, 2024

(54) HEARING DEVICE COMPRISING A CONNECTOR AND A LOCKING ELEMENT

(71) Applicant: GN Hearing A/S, Ballerup (DK)

(72) Inventor: Anders Hjermø Michaelsen, Bagsværd (DK)

(73) Assignee: GN HEARING A/S, Ballerup (DK)

( * ) Notice: Subject to any disclaimer, the term of this patent is extended or adjusted under 35 U.S.C. 154(b) by 93 days.

(21) Appl. No.: 17/702,727

(22) Filed: Mar. 23, 2022

(65) Prior Publication Data

US 2022/0286793 A1 Sep. 8, 2022

Related U.S. Application Data

(63) Continuation of application No. PCT/EP2020/079578, filed on Oct. 21, 2020.

(30) Foreign Application Priority Data

Oct. 28, 2019 (EP) .................................... 19205701

(51) Int. Cl.
*H04R 25/00* (2006.01)

(52) U.S. Cl.
CPC ........... *H04R 25/556* (2013.01); *H04R 25/65* (2013.01); *H04R 2225/0213* (2019.05); *H04R 2225/57* (2019.05)

(58) Field of Classification Search
None
See application file for complete search history.

(56) References Cited

U.S. PATENT DOCUMENTS

| | | | | |
|---|---|---|---|---|
| 9,161,143 B2 * | 10/2015 | Tan | H04R 25/554 |
| 10,038,960 B2 * | 7/2018 | Beyfuss | G10K 11/22 |
| 10,187,735 B2 * | 1/2019 | Johansen | H04R 25/65 |
| 2008/0260192 A1 | 10/2008 | Yanz et al. | |
| 2012/0014549 A1 * | 1/2012 | Higgins | H01R 24/62 29/874 |

(Continued)

FOREIGN PATENT DOCUMENTS

| | | |
|---|---|---|
| CN | 101507294 | 8/2009 |
| CN | 105933839 | 9/2016 |

(Continued)

OTHER PUBLICATIONS

International search report dated Dec. 18, 2020 for PCT/EP2020/079578.

(Continued)

*Primary Examiner* — Paul W Huber
(74) *Attorney, Agent, or Firm* — Vista IP Law Group, LLP

(57) ABSTRACT

The disclosure relates to a hearing device comprising: —a behind-the-ear housing, where the housing comprises a bottom part, a top part opposite the bottom part, a front part, and a rear part opposite the front part, —a connector, the connector is configured to be removably attached to the housing, where the connector is configured for connecting the housing to an element, the element is being configured to be arranged in or at the ear of the user, wherein the housing comprises a locking element, where the locking element is configured for locking the connector to/in the housing, and wherein the housing comprises a guide for at least a part of the connector.

28 Claims, 9 Drawing Sheets

(56) References Cited

U.S. PATENT DOCUMENTS

Figure 1A:
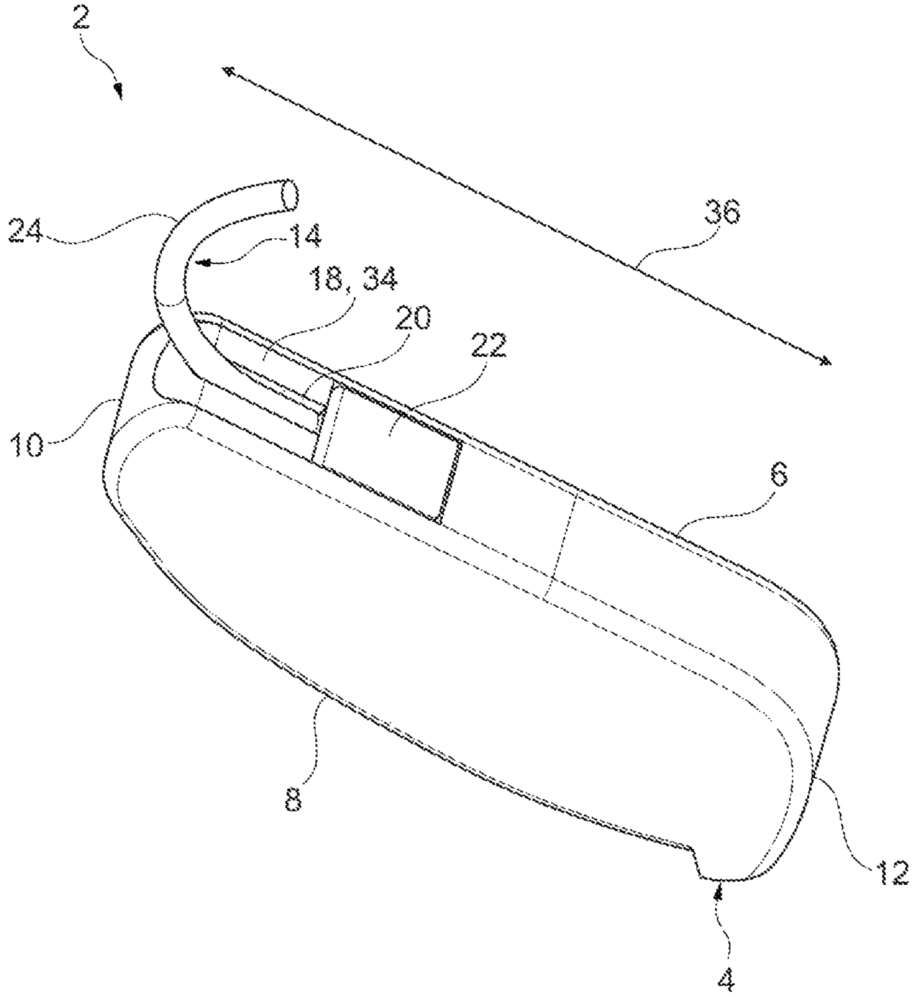

| | | | | |
|---|---|---|---|---|
| 2012/0063621 | A1* | 3/2012 | Naumann | H04R 25/607 381/323 |
| 2013/0004005 | A1* | 1/2013 | Barth | H04R 25/607 381/322 |
| 2014/0003638 | A1* | 1/2014 | Barth | H04R 25/607 381/314 |
| 2014/0205120 | A1 | 7/2014 | Barth et al. | |
| 2017/0289711 | A1* | 10/2017 | Maas | H04R 25/60 |
| 2019/0200145 | A1* | 6/2019 | Kirchhoff | H01R 13/62 |

FOREIGN PATENT DOCUMENTS

| | | |
|---|---|---|
| EP | 2456235 | 5/2012 |
| EP | 3503587 | 6/2019 |

OTHER PUBLICATIONS

European search report dated Dec. 19, 2019 for EP 19205701.6.
International Preliminary Report on Patentability for International Appln. No. PCT/EP2020/079578 dated May 3, 2022.
Foreign Office Action dated Jun. 20, 2024 for Chinese Patent Application No. 202080075213.4.
Foreign Summons to Oral Proceedings for EP Patent Appln. No. 19205701.6 dated May 31, 2024.

* cited by examiner

HEARING DEVICE COMPRISING A CONNECTOR AND A LOCKING ELEMENT

RELATED APPLICATION DATA

This application is a continuation of International Patent Application No. PCT/EP2020/079578 filed on Oct. 21, 2020, which claims priority to, and the benefit of, European Patent Application No. 19205701.6 filed on Oct. 28, 2019. The entire disclosures of the above applications are expressly incorporated by reference.

FIELD

The present disclosure relates to a hearing device. More specifically, the disclosure relates to a hearing device comprising a behind-the-ear housing, a connector configured for connecting the housing to an element, and a locking element. The locking element is configured for locking the connector to the housing.

BACKGROUND

Hearing devices may comprise different modules that may be connected by a connector. For example, a hearing device may comprise a behind-the-ear module which, by means of a connector, may be connected to an in-the-ear module. A hearing device comprising different parts provides that a user can disassemble the hearing device into the different parts, such that for example a user can clean a specific part or exchange a part without necessarily having to discard the complete hearing device.

However, it is a problem that a hearing device, which comprises different parts, may be more likely to malfunction if the different parts are not properly and securely locked together by a locking mechanism. Furthermore, since hearing devices are small and delicate objects, a locking mechanism on a hearing device may also be small and delicate with a risk of easily breaking. Furthermore, due to the small size, it is a problem that locking mechanisms tend to require the use of tools, which may make the locking mechanism difficult and cumbersome for a user to operate.

There is a need for an improved hearing device comprising a connector and a locking element.

SUMMARY

Disclosed is a hearing device. The hearing device comprises a behind-the-ear housing. The housing comprises a bottom part, a top part opposite the bottom part, a front part, and a rear part opposite the front part. The hearing device comprises a connector. The connector is configured to be removably attached to the housing. The connector is configured for connecting the housing to an element. The element is configured to be arranged in or at the ear of a user. The housing comprises a locking element. The locking element is configured for locking the connector to or in the housing. The housing comprises a guide for at least a part of the connector.

The hearing device as disclosed provides the advantage that the connector may not be removed from the housing when the connector is locked to or in the housing. Thus, it is an advantage that the connector is prevented from falling out of the housing or from being separated from the housing accidentally or unintentionally. In other words, it is an advantage that the connector may only be removed or separated from the housing of the hearing device, when the locking element does not lock the connector to or in the housing.

A user may be a hearing care professional (HCP), such as a doctor or a hearing device dispenser, or the hearing device wearer.

It is an advantage that the connector may be removably attached to the housing, since this provides that the connector may deliberately or intentionally be removed from the housing. The connector is configured for connecting the housing to an element. Thus, the connector may be connected or attached to the element. Thus, it is an advantage that a particular connector and/or element connected to the connector may be replaced by a different connector and/or element, such that for example a user may change, attach, or detach the connector and/or element for e.g. replacing the connector and/or element or for cleaning the connector and/or element.

It is an advantage that locking the connector to or in the housing may be provided using a free, vacant, unused or unoccupied or unfilled volume or space in the hearing device. In other words, it is an advantage that locking the connector to or in the housing may be provided using available volume or space inside the housing of the hearing device, thus volume or space inside the housing of the hearing device which is not used by other elements or components.

In the context of this specification, the terms “lock”, “locking mechanism”, “locking means” and “locking system” may be used interchangeably and may not be defined as being a specific feature, but rather the terms are used when describing all or some of the components in the hearing device that contribute to locking the connector to or in the housing, such as the behind-the-ear housing, the connector, and the locking element.

It is an advantage that the locking means, and in particular the locking element, may provide that the connector is securely attached to the housing. It is a further advantage that the locking means, and in particular the locking element, may provide that the connector may be securely removed from the housing, such as removed from the housing without breaking the connector or the housing.

It is an advantage that a hearing device comprising a connector lock, such as the locking element for locking the connector, may be provided. It is an advantage that a strong or robust lock may be provided. It is an advantage that the lock may be a mechanical lock, and that the lock may be relatively simple, yet strong. It is an advantage that the lock may be easy and simple to operate. It is an advantage that the lock may be an efficient lock. It is an advantage that the lock may be fast to operate for quickly detaching and attaching the connector to the housing.

The hearing device may be a headset or a hearing aid. The hearing device may comprise a first transducer, e.g. a microphone, to generate one or more microphone output signals based on a received audio signal. The audio signal may be an analogue signal. The microphone output signal may be a digital signal. Thus, the first transducer, e.g. microphone, or an analogue-to-digital converter, may convert the analogue audio signal into a digital microphone output signal. All the signals may be sound signals or signals comprising information about sound. The hearing device may comprise a signal processor. The one or more microphone output signals may be provided to the signal processor for processing the one or more microphone output signals. The signals may be processed such as to compensate for a user’s hearing impairment. The signal processor may provide a modified signal. The hearing device may comprise a receiver or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal.

The input transducer/microphone and the receiver/speaker may be located within a hearing device housing, however, the microphone and/or speaker may alternatively by located in the element, e.g. ITE housing, which is connected to the connector. Thus, the microphone and/or speaker may be located in an in-the-ear-module rather than in the behind-the-ear housing. The hearing device may comprise more than one microphone, and the behind-the-ear housing may comprise at least one microphone and an in-the-ear module may also comprise at least one microphone.

The hearing device signal processor may comprise elements such as an amplifier, a compressor and/or a noise reduction system etc. The signal processor may be implemented in a signal processing chip or a PCB. The hearing device may further have a filter function, such as compensation filter for optimizing the output signal.

The hearing device may furthermore comprise a wireless communication unit, such as a wireless communication circuit, for wireless data communication interconnected with an antenna, such as an radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be any hearing device, such as any hearing device compensating a hearing loss of a wearer of the hearing device, or such as any hearing device providing sound to a wearer, or such as a hearing device providing noise cancellation, or such as a hearing device providing tinnitus reduction/masking. The person skilled in the art is well aware of different kinds of hearing devices and of different options for arranging the hearing device in and/or at the ear of the hearing device wearer.

For example, the hearing device may be a behind-the-ear (BTE) hearing device, in which a behind-the-ear module comprises hearing device components provided as an assembly and mounted in a behind-the-ear housing being configured to be worn behind the ear of a wearer in the operational position. Typically, a sound tube extends from the behind-the-ear housing to the ear canal of the wearer.

For example, the hearing device may be a receiver-in-canal (RIC) or receiver-in-the-ear (RIE or RITE) type hearing device, in which a receiver is positioned in the ear, such as in the ear canal, of a wearer during use, for example as part of an in-the-ear module, while other hearing device components, such as a processor, a wireless communication unit, a battery, etc. are provided as an assembly and mounted in a behind-the-ear housing of a behind-the-ear module. Typically, a wired tube connects the in-the-ear module and the behind-the-ear module. It should be envisaged that the tube module comprising the tube, may comprise further hearing instrument components and connectors.

The hearing device comprises a behind-the-ear housing. The housing comprises a bottom part or side. The housing comprises a top part or side. The top part is opposite the bottom part. The housing comprises a front part or side. The housing comprises a rear part or side. The rear part is opposite the front part. The behind-the-ear housing may comprise any size, shape and/or color. Preferable, the behind-the-ear housing comprises an elongated or longitudinal or extended shape, such that the top part and the bottom part may be longer or more extended than the front part and rear part. Thus, the housing may extend in a longitudinal direction. The behind-the-ear housing may be configured to be worn behind the ear of a user, and the housing may be oriented such that the top part faces substantially upwards and the bottom part faces substantially downwards when the hearing device is worn in its operational position in or at the ear of the user. The top part and the bottom part may be substantially horizontal parts when the hearing device is worn in its operational position in or at the ear of the user. The front part and rear part may be substantially vertical parts when hearing device is worn in its operational position in or at the ear of the user. The front part and rear part may be medial or lateral parts of the housing.

The behind-the-ear housing may be made from plastic material, such as any synthetic or semi-synthetic organic compounds that may be malleable or flexible and so may be molded into a housing. The material may be a hard material or the material may be a soft material. The housing may be made of conducting material, such that the material may allow a flow of electrical current flowing in the material of the housing. The housing may comprise a mix of materials, such that one or more parts or sections or elements of the housing may be made from one material, while another one or more parts or sections or elements of the housing may be made from another material.

The hearing device comprises a connector. The connector is configured to be removably attached to the housing. In other words, the connector is removably or releaseably attached or fixed or mounted or fastened or interconnected to or with the housing. The connector may be mechanically fixed to the housing. The connector may provide a mechanical fixation with the housing. The connector may engage with or be engaged with the housing. The connector may be arranged in the bottom part of the housing. Alternatively, the connector may be arranged to the medial or lateral sides or parts of the housing, such as arranged on the front part or rear part of the housing.

The connector is configured for connecting the housing to an element. The connector may comprise electrical wires or cables for providing an electrical connection between electrical components provided in the housing and electrical components provided in the element. Alternatively or additionally, the connector may comprise tubes, such as sound tubes.

The element may be removably or releaseably attached or fixed or mounted or fastened or interconnected to or with the connector. Alternatively, the element may be an integrated non-removable part of the connector. The element is configured to be arranged in or at the ear of the user. The element may be an in-the-ear module, an in-the-ear housing, a receiver in the ear, such as a receiver configured for being provided in an ear of a user, and/or a receiver in the ear canal, such as a receiver being configured for being provided in an ear canal of a user. The element may comprise a microphone and/or a receiver. The element may comprise a sport lock that may provide extra support to the hearing device placement and may further assist in removing the hearing device from the ear. The element may be part of the hearing device.

The housing comprises a locking element. The locking element is configured for locking the connector to or in the housing. The locking element may comprise an elongated or longitudinal shape. The locking element may extend in a longitudinal direction.

The housing comprises a guide for at least a part of the connector. The guide may accommodate at least a part of the connector. At least part of the connector may be provided or arranged in or within the guide. The guide may be configured for guiding, directing, conveying, securing, retaining etc. at least a part of the connector. The connector may be guided in the housing and/or in the locking element by the guide.

It is an advantage that the guide may guide or lead or facilitate movement or displacement or direction of the connector within the locking element during insertion and/or removal of the connector into the housing.

According to some embodiments, the guide is provided in the locking element. The guide may comprise a carved out section or a recess or a furrow of/in the locking element. The guide may have an elongated or longitudinal shape in the locking element. A shape of the grove may be elongated or extended along a longitudinal direction of the housing.

According to some embodiments, the connector is configured to be arranged or provided in the bottom part of the housing. Thus, the locking element, which is configured for locking the connector to/in the house, may also be configured to be arranged or provided in the bottom part of the housing. Alternatively, the connector and the locking element may be configured to be arranged or provided in the top part or the front part or the rear part of the housing.

It is an advantage that having the connector arranged and thus locked in the bottom part of the housing provides that free, available, unused or unoccupied or unfilled volume or space in the hearing device may be utilized. In other words, it is an advantage that providing or locking the connector to or in the bottom of the housing may be provided using available volume or space inside the housing of the hearing device, thus volume or space inside the housing of the hearing device which is not used by other elements or components.

According to some embodiments, the connector comprises a first electronic connection element and a second electronic connection element. The first electronic connection element is configured to be arranged in a depression in the bottom part of the housing.

The depression or hole or indentation or connector socket or receiving part of the housing provided in the bottom part of the housing may be configured to accommodate the first electronic connection element. An overlap may be provided between a part of the first electronic connection element and a part of the locking element, such as in the interface between the first electronic connection element and the locking element.

The first electronic connection element may comprise a first side and a second side, the first side may be provided opposite the second side. The first side may face inwards towards the housing, when the first electronic connection element is arranged in the depression in the housing. The second side may face outwards such as away from the housing, when the first electronic connection element is arranged in the depression in the housing. The first electronic connection element may comprise a printed circuit board (PCB) and/or may comprise electronic or electrical components that may be provided on a substrate. The PCB may be arranged on the first side of the first electronic connection element. The PCB may comprise one or more connections or contacts. The bottom of the depression in the housing may likewise comprise one or more connections or contacts. The one or more connections provided on the PCB and in the bottom of the depression, respectively, may provide an electrical connection between electronic or electrical components, such as for example a receiver, that may be provided in the element connected to the connector and electronic or electrical components provided in the housing, such as for example a signal processor. The first electronic connection element may be connected to the second electronic connection element.

The first electronic connection element is configured to be arranged in a depression in the bottom part of the housing such as that when the first electronic connection element is arranged in the depression in the bottom part of the housing, the second side of the first electronic connection element may be flush or aligned with an outer surface of the housing, such as may be flush with an outer surface side of the bottom part of the housing. Thus, when the first electronic connection element is arranged in the depression in the bottom part of the housing, the second side of the first electronic connection element may provide a part of the overall outer surface of the hearing device housing.

The second electronic connection element may be connected or attached to the element, said element may for example be an in-the-ear module. The element may be removably or releaseably connected or attached or fixed or mounted or fastened or interconnected to or with the second electronic connection element. The second electronic connection element may comprise electrical wires or cables for providing an electrical connection between electrical components provided in the housing and electrical components provided in the element. Alternatively or additionally, the second electronic connection element may comprise tubes, such as sound tubes.

It is an advantage that having the first electronic connection element arranged in the depression in the bottom part of the housing provides that free, available, unused or unoccupied or unfilled volume or space in the hearing device may be utilized. In other words, it is an advantage that providing the first electronic connection element in the depression in the bottom of the housing may be provided using available volume or space inside the housing of the hearing device, thus volume or space inside the housing of the hearing device which is not used by other elements or components.

According to some embodiments, the second electronic connection element of the connector comprises a primary part and a secondary part. The primary part is configured to be arranged in the guide. The secondary part is configured to extend from the housing.

The guide may be configured to accommodate at least a part of the connector, such as the primary part of the second electronic connection element of the connector. The second electronic connection element of the connector may comprise a curved or curled or bended shape. The primary part of the second electronic connection element of the connector may be configured to be accommodated in the guide, thus the primary part may be configured to be provided or immersed in the guide. The secondary part of the second electronic connection element of the connector may be configured to extend or protrude from the guide, such as extend from the locking element, such as extend from the housing. Thus, a part of the connector comprising a curved shape may be configured to be provided in the guide, while another part of the connector may be configured to extend from the housing.

It is an advantage that the secondary part extends from the housing as this provides that the element, which may be part of the hearing device and which may be removably attached to the second electronic connection element, may be provided outside of the housing.

It is an advantage that the primary part is configured to be arranged in the guide, since this provides that the guide may guide or lead or facilitate movement or displacement or direction of the primary part of the connector within the locking element during insertion and/or removal of the connector into the housing.

According to some embodiments, the locking element is configured to shift or change between a first state and a second state. The first state is an open state, in which open state the locking element is configured to provide that the connector can be arranged in or removed from the bottom part of the housing. The second state is a lock state, in which lock state the locking element is configured to provide that the connector cannot be arranged in or removed from the bottom part of the housing.

In other words, the first state is a state where the locking element is open, whereby the connector is configured to be attached or detached in the housing. The second state is a state where the locking element is closed, whereby the connector cannot be attached or detached in the housing. Thus, the locking element may be configured to shift between an open state and a locked state or may be configured to shift between being open and being locked.

In the first state, the locking element may be configured to provide that the first electronic connection element of the connector may be arranged in and/or removed from the bottom part of the housing, such as from the depression in the bottom part of the housing. In the second state, the locking element may be configured to provide that the first electronic connection element of the connector cannot be arranged in and/or removed from the bottom part of the housing, such as from the depression in the bottom part of the housing.

It is an advantage that the second state of the locking element may prevent the connector from falling out of the housing or from being separated from the housing accidentally or unintentionally. In other words, it is an advantage that the connector may only be removed or separated from the housing of the hearing device, when the locking element is in the first state.

It is a further advantage that the first state of the locking element may provide that the connector may be securely removed from the housing, such as removed from the housing without breaking the connector or the housing.

According to some embodiments, the locking element is configured to shift/change between the first state and the second state by moving the locking element in a direction parallel to a longitudinal direction of the housing. The longitudinal direction of the housing is extending from the front part of the housing to the rear part of the housing.

The direction parallel to the longitudinal direction of the housing may be a same direction as the longitudinal direction of the housing.

It is an advantage to shift between the first and the second state by moving the locking element, since this provides that locking and/or unlocking the lock and/or the locking element may be a manual operation, for example by a user using a finger or a fingernail to slide or press or push the locking element, such that the locking element may change between the first state and the second state.

According to some embodiments, moving the locking element in a direction parallel to a longitudinal direction of the housing comprises moving the locking element in a direction parallel to a surface of the part of the housing in which the locking element is configured to be arranged or provided.

The locking element may be configured to be arranged in the bottom part of the housing. Thus, moving the locking element in a direction parallel to the longitudinal direction of the housing may comprise moving the locking element in a direction parallel to the surface of the bottom part of the housing.

According to some embodiments, when the locking element is in the first state, at least a part of the locking element protrudes from the housing. When the locking element is in the second state, the locking element is flush or aligned with the bottom part of the housing.

When the locking element is in the first state, at least a part of the locking element may protrude from the front part and/or the bottom part of the housing. When the locking element is in the first state, at least a part of the locking element may protrude from an interface or a border between the front part and the bottom part of the housing. When the locking element is in the second state, the locking element may be flush or aligned with an outer surface of the housing, with an outer surface of the bottom part of the housing, with the front part of the housing, with the front part of the housing and the bottom part of the housing and/or with the front part of the housing while also being flush or aligned with the bottom part of the housing.

When the locking element is in the second state, the locking element may be flush or aligned with the surface, such as outer surface, of the part of the housing in which the locking element is configured to be arranged or provided.

It is an advantage that a user easily can recognize if the locking element is in a first or second state. Furthermore, it is an advantage that, when the locking element is in the first state, a user can push or move the protruding part of the locking element, such that the user push or move the locking element to a second state, such that a user can close the lock.

According to some embodiments, the guide provided in the locking element comprises a channel, such as a carved out section or recess or furrow, for accommodating the primary part of the second electronic connection element of the connector, and wherein the locking element is configured to change between the first state and the second state, while the primary part of the second electronic connection element of the connector is accommodated in the channel.

It is an advantage that the locking element may move and change state, such as from a first state to a second state or from a second state to a first state, while the primary part of the second electronic connection element is provided in the channel, thus the locking element may slide around the second electronic connection element. It is an advantage that the channel in the locking element may provide that the connector may be locked in the housing while at least a part of the connector extends from the housing.

According to some embodiments, the connector is configured to be arranged in the bottom part of the housing by insertion of the first electronic connection element of the connector into the depression in the bottom part of the housing, wherein a direction of the insertion is in an angle between 10-80 degrees relative to the longitudinal direction of the housing, such as between 20-70, such as between 30-60, such as between 40-50, such as about 45. A 0 degree angle of insertion may correspond to direct insertion in the front part, while a 90 degrees angle of insertion may correspond to insertion straight down in the bottom part. Thus, the direction of the insertion being between 10-80 degrees relative to the longitudinal direction of the housing may correspond to an action which may be a combination of direct insertion in the front part and insertion straight down in the bottom part. The angle may be an inclined angle. The inclined insertion may be termed a "ski boot" insertion.

It is an advantage that the connector may be inserted at an angle between 10-80 degrees relative to the longitudinal direction of the housing, as this provides that the connector is securely inserted in the housing prior to locking the lock, such as prior to locking the connector to or in the housing.

According to some embodiments, the first electronic connection element of the connector comprises an inclined plane facing the locking element, whereby a groove is provided between the locking element and the first electronic connection element of the connector, when the locking element is in the second state. Thus, the second side of the first electronic connection element, which may face outwards such as away from the housing, when the first electronic connection element is arranged in the depression in the housing, said second side may comprise a inclined plane facing the locking element. A groove may provided in an interface between the locking element and the first electronic connection element of the connector, when the locking element is in the second state.

It is an advantage that a user may use a fingertip and/or nail to move or push or pull the locking element from the second state of the locking element to a first state. Thus, it is an advantage that no tool is needed to unlock the lock, such as to move the locking element from an locked state to an open state.

According to some embodiments, the locking element comprises a first side and a second side, wherein the first side is opposite the second side, and the first side comprises the guide, and the second side comprises a protrusion which is configured to slide between a first position and a second position, the first position corresponds to the first state of the locking element and the second position corresponds to the second state of the locking element. The protrusion may comprise a latch. The protrusion may be configured to slide between the first and the second position in a corresponding lane or track or trail comprised in the housing. The lane comprised in the housing may comprise three sections, a first section configured to accommodate the protrusion in the first position when the locking element is in the first state, a second section configured to accommodate the protrusion in the second position when the locking element is in the second state, and a third section configured to accommodate the protrusion when the protrusion is in an intermediate position between the first and the second position. The intermediate position may not be a stationary position for the protrusion, in other words the protrusion may not remain in the intermediate position for an extended time. Thus, the third section of the lane comprised in the housing may comprise a rise or elevation relative to the first and second sections. Thus, when the protrusion may slide between the first and the second section, the protrusion may pass the rise in the third section of the lane.

It is an advantage that the protrusion may function as a latch with a spring effect. It is an advantage that a robust lock, which is easy to operate is provided.

According to some embodiments, the locking element comprises a track for directing the locking element within the housing while the locking element is changing between the first state and the second state.

The track may be arranged on a side of the locking element other than the first side and other than the second side. Thus the track may be arranged on a third and/a fourth side of the locking element, the third and fourth side of the locking element may be provided opposite each other.

The housing may comprise a part that corresponds to the track in the locking element, thus the housing may comprise a rail that is provided or arranged or accommodated in the track of the locking element. The track may comprise an indentation in the locking element, while the rail may comprise a protrusion in the housing.

It is an advantage that the track provides that the locking element is guided when the locking element moves between the first and second positions. Thus, it is an advantage that the track and/or corresponding rail may guide the movement of the locking element. Thus, it is an advantage that a robust lock, such as a robust mechanical lock is provided.

The connector may comprise a member or stop means which functions to prevent pull forces from opening the lock or locking element, e.g. to prevent unintentional detachment of the connector from the housing. The member may be provided at the interface of the first electronic connection element and the second electronic connection element. The member may be a part of the first electronic connection element and the member may protrude from the first electronic connection element. When the connector is inserted in the housing, the member may be provided in a corresponding indentation of the rail provided in the housing. Thus, when the connector is inserted in the housing, pull force in the connector in the longitudinal direction of the housing may be obtained in the bottom of the housing. When the connector is inserted in the housing and when the locking element is in the second state, pull forces in the connector in a direction that is perpendicular to the longitudinal direction of the housing may be obtained by the locking element. Thus, it is a further advantage that pull forces in the connector is obtained and that unintentional detachment of the connector from the housing may be prevented.

The present disclosure relates to different aspects including the hearing device described above and in the following, and corresponding hearing devices, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTIONS OF THE DRAWINGS

Figure 2A:
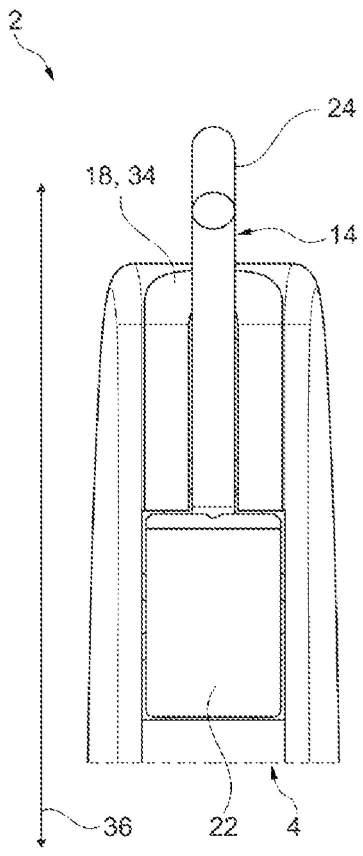
Figure 3A:
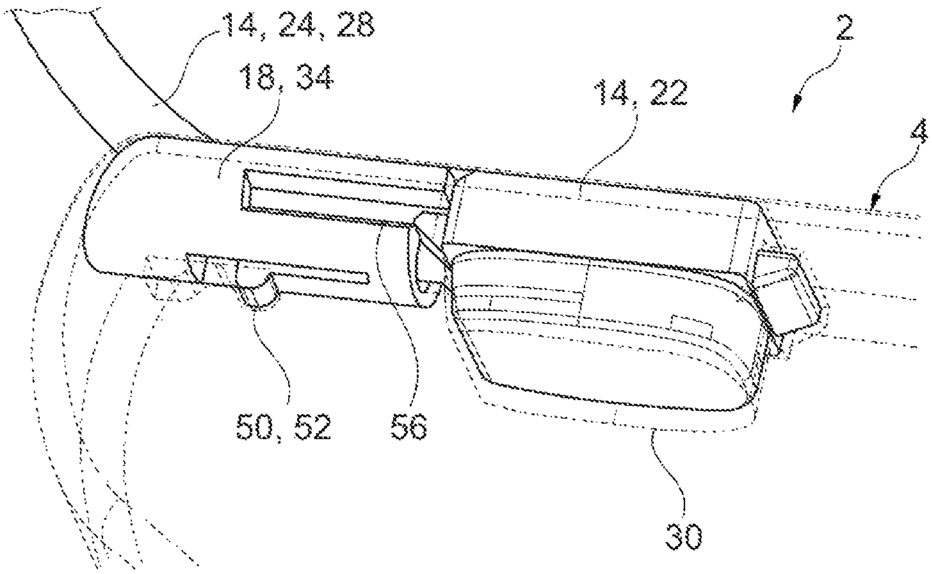
Figure 4A:
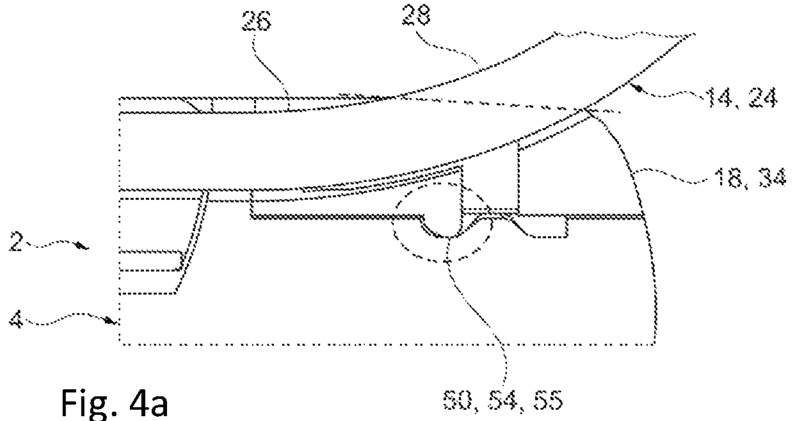
Figure 5A:
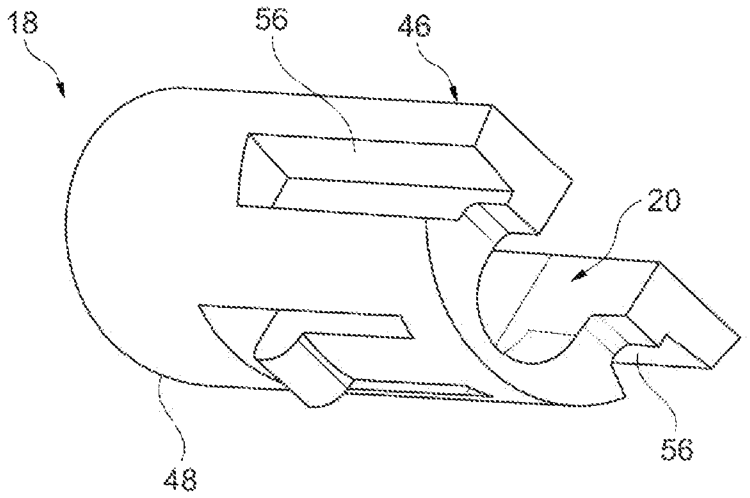
Figure 6:
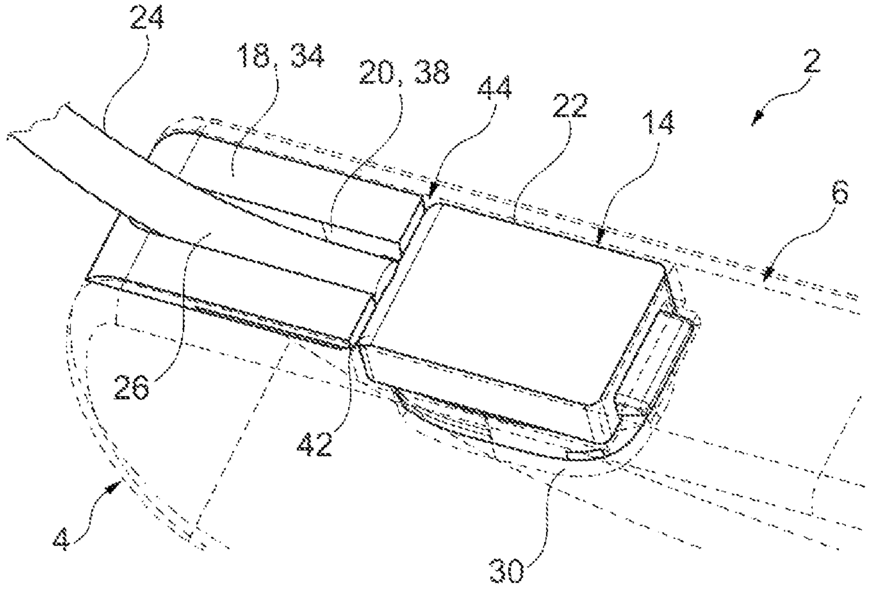
Figure 7:
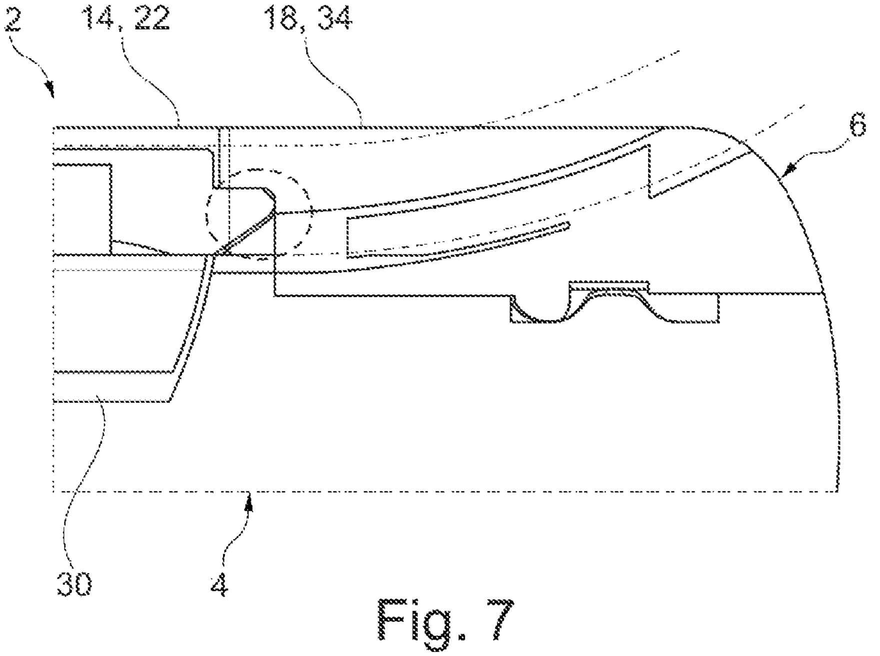
Figure 8:
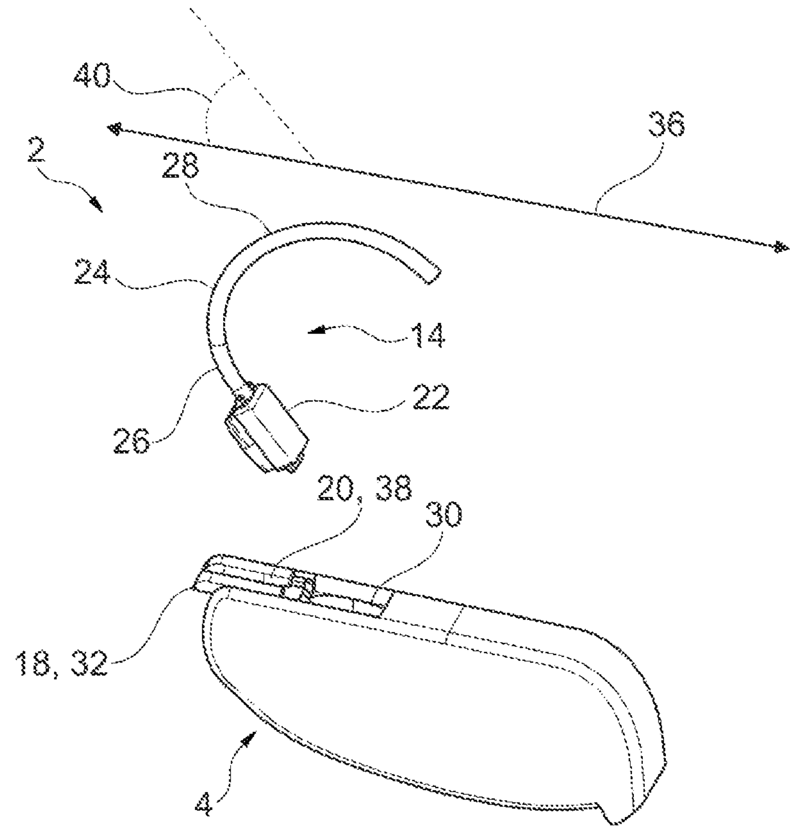
Figure 9:
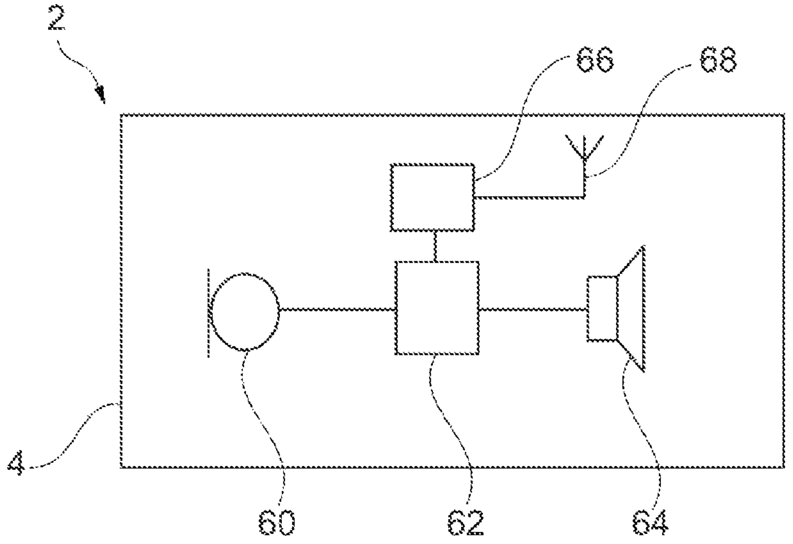

The above and other features and advantages will become readily apparent to those skilled in the art by the following detailed description of exemplary embodiments thereof with reference to the attached drawings, in which:

FIGS. 1*a*), 1*b*) and 1*c*) schematically illustrate an exemplary hearing device, FIGS. 2*a*) and 2*b*) schematically illustrate a part of an exemplary hearing device, FIGS. 3*a*) and 3*b*) schematically illustrate a cross-sectional view of a part of an exemplary hearing device, FIGS. 4*a*), 4*b*) and 4*c*) schematically illustrate a cross-sectional view of a part of an exemplary hearing device, FIGS. 5*a*) and 5*b*) schematically illustrate an exemplary locking element according to an embodiment of the present disclosure, FIG. 6 schematically illustrates a cross-sectional view of a part of an exemplary hearing device, FIG. 7 schematically illustrates a cross-sectional view of a part of an exemplary hearing device, FIG. 8 schematically illustrates an exemplary hearing device, and FIG. 9 schematically illustrates an exemplary hearing device.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1B:
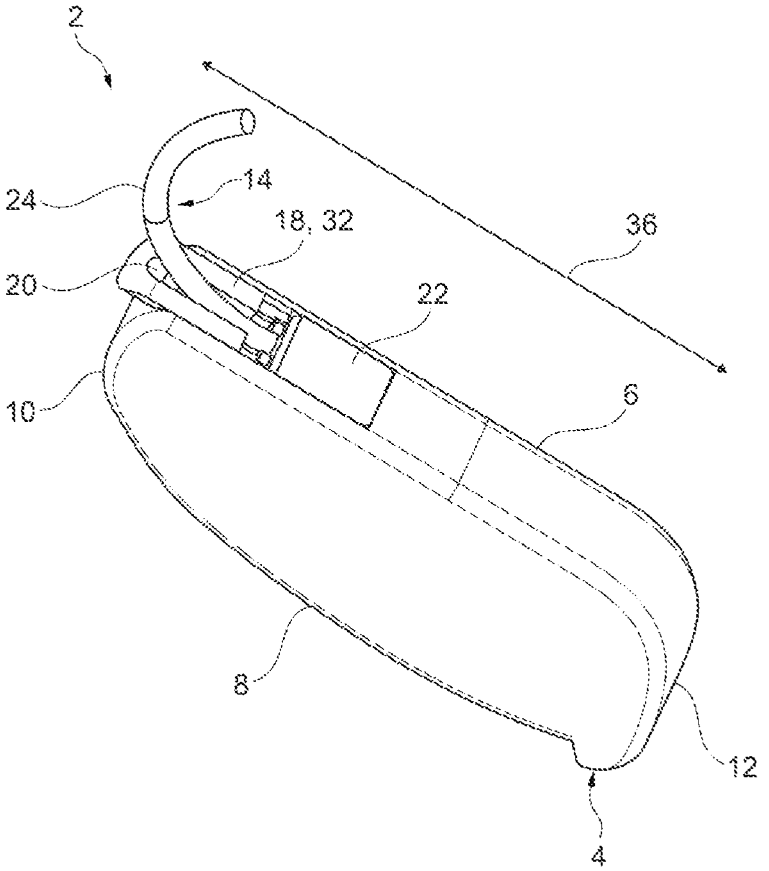
Figure 1C:
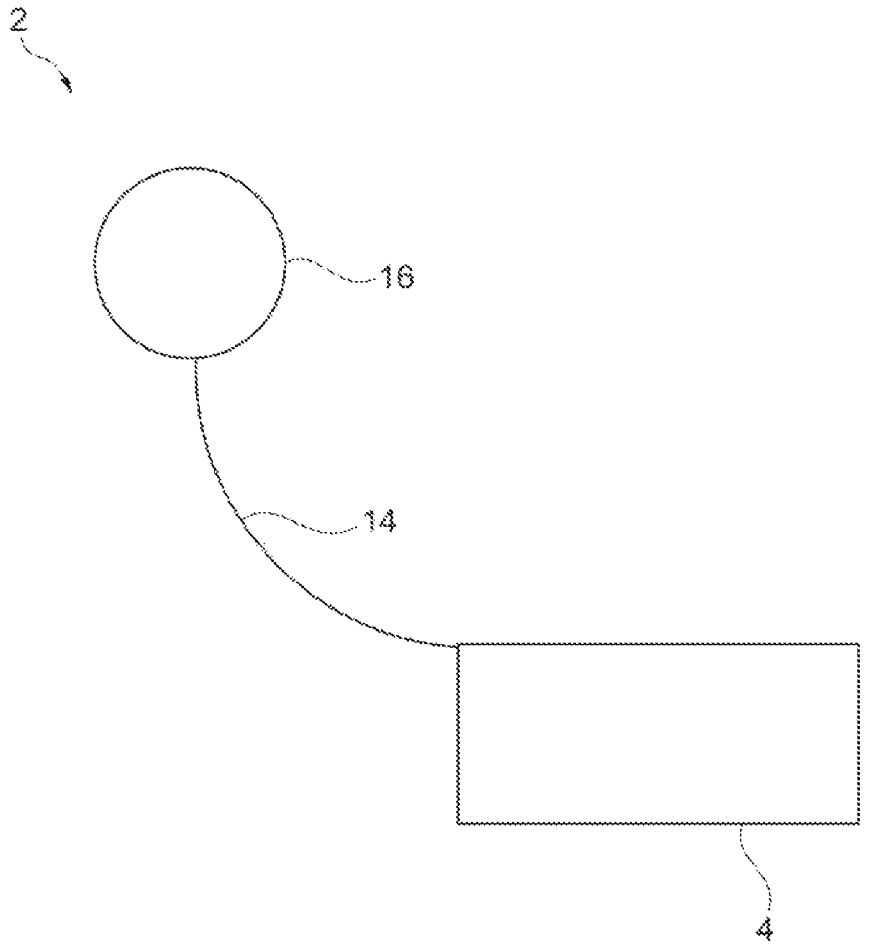

FIGS. 1*a*, 1*b* and 1*c* schematically illustrate an exemplary hearing device 2. The hearing device 2 comprises a behind-the-ear housing 4. The housing 4 comprises a bottom part 6, a top part 8 opposite the bottom part 6, a front part 10, and a rear part 12 opposite the front part 10. The hearing device 2 comprises a connector 14. The connector 14 is configured to be removably attached to the housing 4. The connector 14 is configured for connecting the housing 4 to an element 16, as shown in FIG. 1*c*. The element 16 is being configured to be arranged in or at the ear of the user. The housing 4 comprises a locking element 18. The locking element 18 is configured for locking the connector 14 to/in the housing 4. The housing 4 comprises a guide 20 for at least a part of the connector 14.

The guide 20 is provided in the locking element 18.

The connector 14 is configured to be arranged in the bottom part 6 of the housing 4.

The connector 14 comprises a first electronic connection element 22 and a second electronic connection element 24, wherein the first electronic connection element 22 is configured to be arranged in a depression (not shown) in the bottom part 6 of the housing 4.

The locking element 18 is configured to shift/change between a first state 32 and a second state 34. The first state 32, which is shown in FIG. 1*b*, is an open state, in which open state the locking element 18 is configured to provide that the connector 14 can be arranged in or removed from the bottom part 6 of the housing 4. The second state 34, which is shown in FIG. 1*a*, is a lock state, in which lock state the locking element 18 is configured to provide that the connector 14 cannot be arranged in or removed from the bottom part 6 of the housing 4.

The locking element 18 is configured to shift or change between the first state 32 (shown in FIG. 1*b*) and the second state 34 (shown in FIG. 1*a*) by moving the locking element 18 in a direction parallel to a longitudinal direction 36 of the housing 4, the longitudinal direction 36 of the housing 4 extending from the front part of the housing 4 to the rear part of the housing 4.

FIGS. 1*a* and 1*b* show that moving the locking element 18 in a direction parallel to a longitudinal direction 36 of the housing 4 comprises moving the locking element 18 in a direction parallel to a surface of the part of the housing 4 in which the locking element is located.

FIG. 1*b* shows that when the locking element 18 is in the first state 32, at least a part of the locking element 18 protrudes from the housing 4, such as protruding from a surface of the housing. FIG. 1*a* shows that when the locking element 18 is in the second state 34 the locking element 18 is flush or aligned with the bottom part 6 of the housing 4.

Figure 2B:
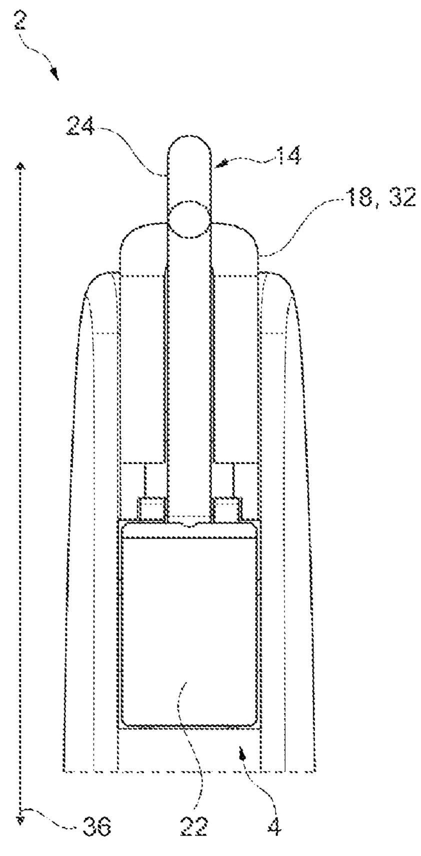

FIGS. 2*a* and 2*b* schematically illustrate a part of an exemplary hearing device 2. FIGS. 2*a* and 2*b* show a part of the hearing device 2, as viewed from a different angle than in FIG. 1.

The hearing device 2 comprises a behind-the-ear housing 4 and a connector 14. The housing 4 comprises a locking element 18. The locking element 18 is configured for locking the connector 14 to/in the housing 4.

The locking element 18 is configured to shift or change between a first state 32 and a second state 34. The first state 32, which is shown in FIG. 2*b*, is an open state, in which open state the locking element 18 is configured to provide that the connector 14 can be arranged in or removed from the bottom part 6 of the housing 4. The second state 34, which is shown in FIG. 2*a*, is a lock state, in which lock state the locking element 18 is configured to provide that the connector 14 cannot be arranged in or removed from the bottom part 6 of the housing 4.

The locking element 18 is configured to shift or change between the first state 32 (shown in FIG. 2*b*) and the second state 34 (shown in FIG. 2*a*) by moving the locking element 18 in a direction parallel to a longitudinal direction 36 of the housing 4, the longitudinal direction 36 of the housing 4 extending from the front part of the housing 4 to the rear part of the housing 4.

Figure 3B:
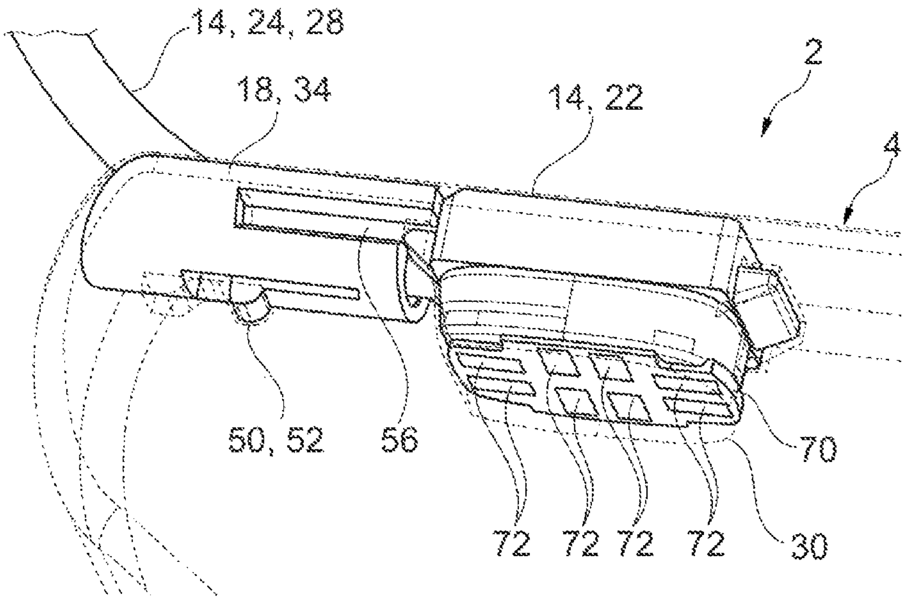

FIGS. 3*a* and 3*b* schematically illustrate a cross-sectional view of a part of an exemplary hearing device 2. The hearing device 2 comprises a behind-the-ear housing 4 (illustrated by the thin grey lines) and a connector 14. The housing 4 comprises a locking element 18. The locking element 18 is configured for locking the connector 14 to/in the housing 4.

The connector 14 comprises a first electronic connection element 22 and a second electronic connection element 24, wherein the first electronic connection element 22 is configured to be arranged in a depression 30 in the bottom part 6 of the housing 4.

The second electronic connection element 24 of the connector 14 comprises a primary part (not shown) and a secondary part 28, wherein the primary part is configured to be arranged in the guide 20, and wherein the secondary part 28 is configured to extend from the housing 4.

FIG. 3*b* shows that the first electronic connection element 22 may comprise a printed circuit board (PCB) 70. The PCB 70 may comprise one or more contacts 72. The bottom of the depression 30 in the housing 4 may likewise comprise one or more contacts (not shown). The one or more contacts 72 provided on the PCB 70 and in the bottom of the depression 30, respectively, may provide an electrical connection between electrical components that may be provided in the element (not shown) connected to the connector 14, and components provided in the housing 4.

FIG. 4 schematically illustrates a cross-sectional view of a part of an exemplary hearing device 2. The hearing device 2 comprises a behind-the-ear housing 4 and a connector 14. The housing 4 comprises a locking element 18. The locking element 18 is configured for locking the connector 14 to/in the housing 4. The connector comprises a second connection element 24.

The second electronic connection element 24 of the connector 14 comprises a primary part 26 and a secondary part 28. The primary part 26 is configured to be arranged in the guide. The secondary part 28 is configured to extend from the housing 4. In FIG. 4, a dashed line schematically illustrates that the connector 14 comprises a primary part 26 (below the dashed line) and a secondary part 28 (above the dashed line). Thus, FIG. 4 shows that the primary part 26, which is the part of the second electronic connection element 24 that is provided below the dashed line, is provided inside or within the housing 4, or in other words, is encompassed by the housing 4, when the connector 14 is attached to the housing 4. Likewise, FIG. 4 shows that the secondary part 28, which is the part of the connector 14 that is provided above the dashed line, extends from the housing 4, or in other words, is provided outside of the housing 4, when the connector is attached to the housing 4.

Figure 4B:
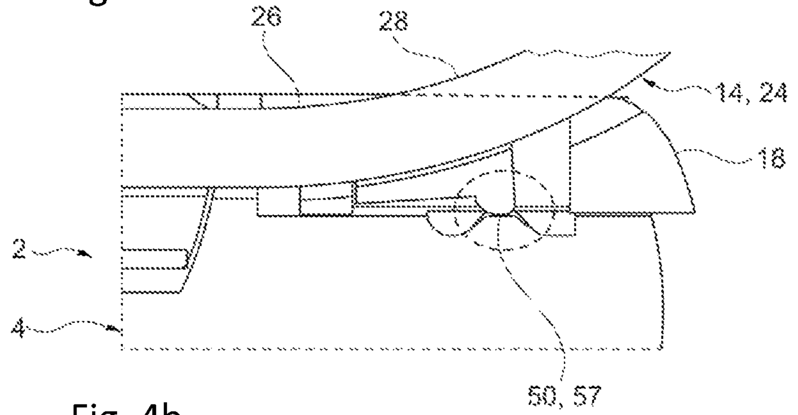
Figure 4C:
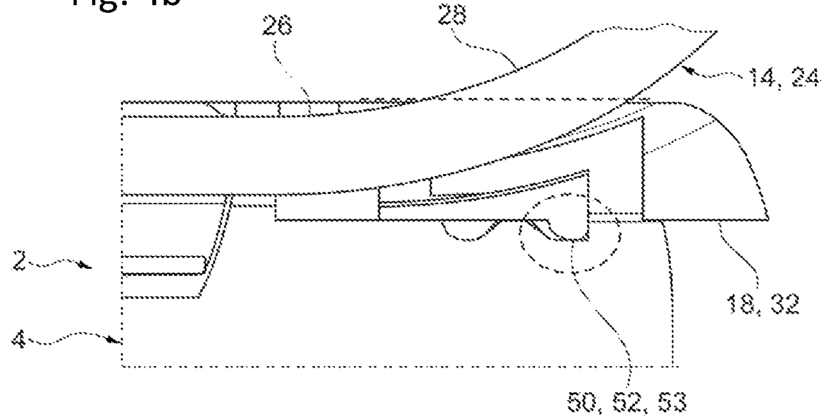

The locking element 18 is configured to shift or change between a first state 32 and a second state 34. The first state 32, which is shown in FIG. 4*c*, is an open state, in which open state the locking element 18 is configured to provide that the connector 14 can be arranged in or removed from the bottom part 6 of the housing 4. The second state 34, which is shown in FIG. 4*a*, is a lock state, in which lock state the locking element 18 is configured to provide that the connector 14 cannot be arranged in or removed from the bottom part 6 of the housing 4. FIG. 4*b*, shows the locking element 18 being in an intermediate state, i.e. between the first state 32 and the second state 34.

FIG. 4 shows that, when the connector 14 is inserted in the housing 4, the arrangement of the connector 14 and more specifically, the arrangement of the primary part 26 of the connector 14, remains stationary relative to the remainder of the housing, regardless of which state the locking element 18 is in, because the guide (not shown) provided in the locking element 18 comprises a channel (not shown) for accommodating the primary part 26 of the second electronic connection element 24 of the connector 14. The locking element 18 is thus configured to change between the first state 32 (shown in FIG. 4*c*) and the second state 34 (shown in FIG. 4*a*), while the primary part 26 of the second electronic connection element 24 of the connector 14 is accommodated in the channel (not shown). The channel and guide is shown in FIG. 5*a*, which shows the locking element 18 as viewed from a different angle.

The locking element 18 comprises a protrusion 50 which is configured to slide between a first position 52 and a second position 54. A dotted circle highlights the position of the protrusion 50 in FIG. 4. The first position 52 (shown in FIG. 4*c*) corresponds to the first state 32 of the locking element 18. The second position 54 (shown in FIG. 4*a*) corresponds to the second state 34 of the locking element 18. When the locking element is between the first state 32 and the second state 34, the protrusion 50 is between the first position 52 and the second position 54, as shown in FIG. 4*b*.

FIG. 4 shows that the protrusion 50 may comprise a latch. The protrusion 50 may be configured to slide between the first position 52 and the second position 54 in a corresponding lane comprised in the housing 4. The lane comprised in the housing 4 may comprise three sections, a first section 53 configured to accommodate the protrusion 50 in the first position 52 when the locking element 18 is in the first state 32 (as shown by the dashed circle in FIG. 4*c*), a second section 55 configured to accommodate the protrusion 50 in the second position 54 when the locking element 18 is in the second state 34 (as shown by the dashed circle in FIG. 4*a*), and a third section 57 configured to accommodate the protrusion 50 when the protrusion 50 is in an intermediate position between the first position 52 and the second position 54 (as shown by the dashed circle in FIG. 4*b*). The intermediate position may not be a stationary position for the protrusion 50, in other words the protrusion 50 functions as a latch with a spring effect and may not remain in the intermediate position for an extended time. Thus, as shown in FIG. 4*b*, the third section 57 of the lane comprised in the housing 4 may comprise a rise or elevation relative to the first 53 and second 55 sections. Thus, when the protrusion 50 may slide between the first section 53 in the first position 52 and the second section 55 in the second position 54, the protrusion 50 may pass the rise in the third section 57 of the lane.

Figure 5B:
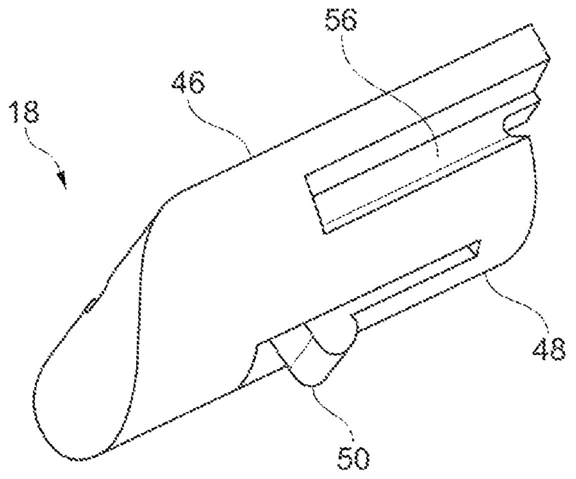

FIG. 5 schematically illustrates an exemplary locking element 18 according to an embodiment of the present disclosure. FIGS. 5*a* and 5*b* show the locking element 18 as seen from two different angles. FIGS. 5*a* and 5*b* show that the locking element 18 comprises a first side 46 and a second side 48, wherein the first side 46 is opposite the second side 48. The first side 46 comprises the guide 20. The second side 48 comprises a protrusion 50 which is configured to slide between a first position 52 and a second position 54. The first position 52 corresponds to the first state 32 of the locking element 18 and the second position 54 corresponds to the second state 34 of the locking element 18.

FIGS. 5*a* and 5*b* show that the locking element 18 comprises a track 56 for directing the locking element 18 within the housing 4 while the locking element 18 is changing between the first state 32 and the second state 34. The track 56 is shown to be arranged on the two sides of the locking element other than the first side 46 and other than the second side 48. Thus, the track 56 is shown to be arranged on two sides of the locking element that are provided opposite to each other, and that are provided opposite the first side 46 and the second side 48.

FIG. 6 schematically illustrates a cross-sectional view of a part of an exemplary hearing device. FIG. 6 shows that the connector 14 is attached to the housing 4. FIG. 6 shows that the connector 14 is arranged in the bottom part 6 of the housing 4, thus that the first electronic connection element 22 is inserted a depression 30 in the bottom part 6 of the housing 4. The locking element 18 is in the second state 34. The locking element is configured to change between the first state (not shown) and the second state 34. An example of the locking element in the first state can be seen in FIGS. 1*b*, 2*b*, 4*c* and 8.

FIG. 6 shows that the first electronic connection element 22 of the connector 14 comprises an inclined plane 42 facing the locking element 18, whereby a groove 44 is provided between the locking element 18 and the first electronic connection element 22 of the connector 14, when the locking element 18 is in the second state 34.

FIG. 6 shows that the locking element comprises a guide. The guide 20 provided in the locking element 18 comprises a channel 38 for accommodating the primary part 26 of the second electronic connection element 24 of the connector 14. The locking element 18 is configured to change between the first state 32 and the second state (not shown), while the primary part 26 of the second electronic connection element 24 of the connector 14 is accommodated in the channel 38.

FIG. 7 schematically illustrates a cross-sectional view of a part of an exemplary hearing device.

FIG. 7 shows that the connector 14 is attached to the housing 4. FIG. 7 shows that the first electronic connection element 22 is inserted in a depression 30 in the bottom part 6 of the housing 4. The locking element 18 is in the second state 34. The locking element is configured to change between the first state (not shown) and the second state 34. An example of the locking element in the first state can be seen in FIGS. 1*b*, 2*b* 4*c*, and 8.

FIG. 7 shows that, when the locking element is in the second state 34, there is an overlap between a part of the first electronic connection element 22 and a part of the locking element 18. The overlap is highlighted by a dashed circle in FIG. 7.

FIG. 8 schematically illustrates an exemplary hearing device. FIG. 8 shows that the connector 14 is configured to be removably attached to the housing 4. FIG. 8 shows the connector 14 being removed, detached or being outside from the housing 4. The connector comprises the first electronic connection element 22 and the second electronic connection element 24. The second electronic connection element 24 comprises the primary part 26 and the secondary part 28. See FIG. 4 for an illustration of that the primary part 26 is configured for being provided inside the housing 4 when the connector 14 is arranged in the housing 4, and that the secondary part 28 is configured for extending from the housing 4 when the connector 14 is arranged in the housing 4.

FIG. 8 shows that the connector 14 is configured to be arranged in the bottom part 6 of the housing 4 by insertion of the first electronic connection element 22 of the connector 14 into the depression 30 in the bottom part 6 of the housing 4. The direction of the insertion is in an angle 40 between 10-80 degrees relative to the longitudinal direction 36 of the housing 4. In FIG. 8, the angle 40 is about 45 degrees relative to the longitudinal direction 36 of the housing 4.

FIG. 8 shows that the locking element 18 comprises a guide 20. The locking element 18 is in the first state 32. The guide 20 provided in the locking element 18 comprises a channel 38 for accommodating the primary part 26 of the second electronic connection element 24 of the connector 14. The locking element 18 is configured to change between the first state 32 and the second state (not shown), while the primary part 26 of the second electronic connection element 24 of the connector 14 is accommodated in the channel 38. An example of the locking element changing between the first state and the second state while the primary part of the second electronic connection element of the connector is accommodated in the channel can be seen in FIG. 4.

FIG. 9 schematically illustrates a block diagram of an exemplary hearing device 2. The hearing device 2 may comprise a first transducer, e.g. a microphone 60, to generate one or more microphone output signals based on a received audio signal. The one or more microphone output signals may be provided to a signal processor 62 for processing the one or more microphone output signals. A receiver or speaker 64 may be connected to an output of the signal processor 62 for converting the output of the signal processor into a signal modified to compensate for a user's hearing impairment, and the signal processor 62 may provide the modified signal to the speaker 64. In FIG. 9, the microphone 60 and the speaker 64 is depictured as located within the hearing device housing 4, however, the microphone 60 and/or speaker 64 may alternatively by located in the element 16 (not shown) which is connected to the connector 14 (not shown). Thus, the microphone 60 and/or speaker 64 may be located in an in-the-ear-module (not shown) rather than in the behind-the-ear housing 4. The hearing device 2 may comprise more than one microphone 60, and the behind-the-ear housing 4 may comprise at least one microphone 60 and an in-the-ear module (not shown) may also comprise at least one microphone 60.

The hearing device signal processor 62 may comprise elements such as an amplifier, a compressor and/or a noise reduction system etc. The signal processor 62 may be implemented in a signal processing chip or a PCB. The hearing device 2 may further have a filter function, such as compensation filter for optimizing the output signal.

The hearing device 2 may furthermore comprise a wireless communication unit 66, such as a wireless communication circuit, for wireless data communication interconnected with an antenna 68, such as an radio frequency (RF) antenna or a magnetic induction antenna, for emission and reception of an electromagnetic field. The wireless communication unit 66, including a radio or a transceiver, may connect to the hearing device signal processor 62 and the antenna 68, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

2 hearing device
4 (behind-the-ear) housing
6 bottom part of housing
8 top part of housing
10 front part of housing
12 rear part of housing
14 connector
16 element
18 locking element
20 guide
22 first electronic connection element
24 second electronic connection element
26 primary part of second electronic connection element
28 secondary part of second electronic connection element
30 depression
32 first state of locking element
34 second state of locking element
36 longitudinal direction
38 channel
40 angle relative to the longitudinal direction
42 inclined plane
44 groove
46 first side of locking element
48 second side of locking element
50 protrusion
52 first position of protrusion
53 first section of lane
54 second position of protrusion

55 second section of lane
56 track
57 third section of lane
60 microphone
62 signal processor
64 speaker
66 wireless communication unit
68 antenna
70 PCB
72 contact

The invention claimed is:

1. A hearing device comprising:

a housing, wherein the housing is a behind-the-ear housing, and wherein the housing comprises a first housing part and a second housing part that is moveable relative to the first housing part; and a connector configured to removably attach to the housing, where the connector is configured to connect the housing to an element, the element configured to be arranged in or at an ear of a user;

wherein the second housing part is a locking element, the locking element configured to lock the connector with respect to the housing, and wherein the second housing part that is moveable relative to the first housing part has an exterior surface defining a channel configured to accommodate at least a part of the connector;

wherein the second housing part is shorter than the first housing part; and wherein the second housing part is slidable in a direction parallel to a longitudinal axis of the first housing part, the longitudinal axis corresponding with a long side of the first housing part.

2. The hearing device according to claim 1, wherein the connector is configured to be arranged at a bottom part of the housing.

3. The hearing device according to claim 1, wherein the connector comprises a first electronic connection element, wherein the first electronic connection element is configured to be arranged in a depression at a bottom part of the housing.

4. The hearing device according to claim 3, wherein the first electronic connection element of the connector is configured for insertion into the depression at the bottom part of the housing, wherein a direction of the insertion is anywhere between 10-80 degrees relative to a longitudinal direction of the housing.

5. The hearing device according to claim 1, wherein the connector comprises a first electronic connection element and a second electronic connection element, and wherein the second electronic connection element of the connector comprises a primary part and a secondary part, wherein the at least the part of the connector is the primary part, and wherein the primary part is configured to be arranged in the channel.

6. The hearing device according to claim 1, wherein the locking element is configured to move between a first state and a second state;

wherein in the first state, the locking element allows an end of the connector to be arranged in, or to be removed from, the housing; and wherein in the second state, the locking element prevents the end of the connector from being arranged in, or being removed from, the housing.

7. The hearing device according to claim 6, further comprising a groove between the locking element and an electronic connection element of the connector, when the locking element is in the second state.

8. The hearing device according to claim 6, wherein when the locking element is in the first state, at least a part of the locking element protrudes from a front part of the first housing part, and when the locking element is in the second state, the locking element is flush or is aligned with the front part of the first housing part.

9. The hearing device according to claim 1, wherein the second housing part comprises a first track for guiding the second housing part to translate relative to the first housing part.

10. The hearing device according to claim 1, wherein the at least the part of the connector comprises a cable.

11. A hearing device comprising:

a housing, wherein the housing is a behind-the-ear housing, and wherein the housing comprises a first housing part and a second housing part that is moveable relative to the first housing part; and a connector configured to removably attach to the housing, where the connector is configured to connect the housing to an element, the element configured to be arranged in or at an ear of a user;

wherein the second housing part is a locking element, the locking element configured to lock the connector with respect to the housing, and wherein the second housing part that is moveable relative to the first housing part has an exterior surface defining a channel configured to accommodate at least a part of the connector;

wherein the second housing part is shorter than the first housing part;

wherein the connector comprises a first electronic connection element, wherein the first electronic connection element is configured to be arranged in a depression at a bottom part of the housing; and wherein the first electronic connection element of the connector comprises an anchor facing the locking element, the anchor having an inclined plane.

12. A hearing device comprising:

a housing, wherein the housing is a behind-the-ear housing; and a connector configured to removably attach to the housing, where the connector is configured to connect the housing to an element, the element configured to be arranged in or at an ear of a user, wherein the housing comprises a guide for at least a part of the connector;

wherein the housing comprises a locking element, the locking element configured to lock the connector with respect to the housing;

wherein the locking element is configured to move between a first position and a second position;

wherein in the first position, the locking element allows the connector to be arranged in, or to be removed from, the housing;

wherein in the second position, the locking element prevents the connector from being arranged in, or being removed from, the housing; and wherein the locking element comprises a first side and a second side, wherein the first side is opposite the second side, and the second side comprises a protrusion which is configured to slide between the first position and the second position.

13. The hearing device according to claim 12, wherein the first position corresponds to a first state of the locking element, and the second position corresponds to a second state of the locking element.

14. A hearing device comprising:

a housing part;

a connector configured to removably attach to the housing part, where the connector is configured to connect the housing part to an element, the element configured to be arranged in or at an ear of a user; and a locking element configured to lock the connector with respect to the housing part;

wherein the locking element comprises a first track for guiding the locking element to translate relative to the housing part;

wherein the locking element is another housing part, and wherein the housing part and the other housing part form a housing for the hearing device;

wherein the other housing part is moveable relative to the housing part, and comprises a latch that is configured to slide relative to the housing part; and wherein the latch of the other housing part comprises a cantilever beam.

15. The hearing device according to claim 14, wherein the other housing part has an exterior surface defining a channel configured to accommodate a cable of the connector.

16. The hearing device according to claim 14, wherein the locking element comprises a second track for guiding the locking element to translate relative to the housing part, and wherein the first track and the second track are offset from, and parallel to, each other.

17. A hearing device comprising:

a housing comprising a first housing part and a second housing part; and a connector configured to removably attach to the housing, where the connector is configured to connect the housing to an element, the element configured to be arranged in or at an ear of a user; and wherein the second housing part is a locking element configured to lock the connector with respect to the housing;

wherein the locking element is slidable in a direction parallel to a longitudinal axis of the first housing part, the longitudinal axis corresponding with a long side of the first housing part.

18. The hearing device according to claim 17, wherein the second housing part is moveable relative to the first housing part, and comprises a latch that is configured to slide relative to the first housing part.

19. The hearing device according to claim 17, wherein the second housing part comprises a first track and a second track for guiding the second housing part to translate relative to the first housing part, and wherein the first track and the second track are offset from, and parallel to, each other.

20. A hearing device comprising:

a housing, wherein the housing is a behind-the-ear housing, and wherein the housing comprises a first housing part and a second housing part that is moveable relative to the first housing part; and a connector configured to removably attach to the housing, where the connector is configured to connect the housing to an element, the element configured to be arranged in or at an ear of a user:

wherein the second housing part is a locking element, the locking element configured to lock the connector with respect to the housing, and wherein the second housing part that is moveable relative to the first housing part has an exterior surface defining a channel configured to accommodate at least a part of the connector;

wherein the second housing part is shorter than the first housing part; and wherein the locking element is moveable in a direction parallel to a surface of the first housing part.

21. A hearing device comprising:

a housing, wherein the housing is a behind-the-ear housing, and wherein the housing comprises a first housing part and a second housing part that is moveable relative to the first housing part; and a connector configured to removably attach to the housing, where the connector is configured to connect the housing to an element, the element configured to be arranged in or at an ear of a user;

wherein the second housing part is a locking element, the locking element configured to lock the connector with respect to the housing, and wherein the second housing part that is moveable relative to the first housing part has an exterior surface defining a channel configured to accommodate at least a part of the connector;

wherein the second housing part is shorter than the first housing part; and wherein the second housing part that is moveable relative to the first housing part comprises a latch that is configured to slide relative to the first housing part.

22. The hearing device according to claim 21, wherein the latch of the second housing part comprises a cantilever beam.

23. A hearing device comprising:

a housing comprising a first housing part and a second housing part; and a connector configured to removably attach to the housing, where the connector is configured to connect the housing to an element, the element configured to be arranged in or at an ear of a user; and wherein the second housing part is a locking element configured to lock the connector with respect to the housing;

wherein the locking element is slidable in a direction parallel to a longitudinal axis of the first housing part, the longitudinal axis corresponding with a long side of the first housing part; and wherein the second housing part has an exterior surface defining a channel configured to accommodate a cable of the connector.

24. A hearing device comprising:

a housing comprising a first housing part and a second housing part; and a connector configured to removably attach to the housing, where the connector is configured to connect the housing to an element, the element configured to be arranged in or at an ear of a user; and wherein the second housing part is a locking element configured to lock the connector with respect to the housing;

wherein the locking element is slidable in a direction parallel to a longitudinal axis of the first housing part, the longitudinal axis corresponding with a long side of the first housing part;

wherein the second housing part is moveable relative to the first housing part, and comprises a latch that is configured to slide relative to the first housing part; and wherein the latch of the second housing part comprises a cantilever beam.

25. A locking element for a hearing device, comprising:

a first side;

a second side opposite from the first side;

a first track at the first side;

a second track at the second side; and a channel between the first track and the second track, wherein the channel is configured to accommodate a cable of the hearing device;

wherein the locking element is configured to slide relative to a housing part of the hearing device via the first track and the second track;

wherein the locking element also comprises a latch configured to slide relative to the housing part.

26. The locking element according to claim 25, wherein the locking element comprises a structural portion that prevents a connector from being detached from the housing part, the connector comprising the cable.

27. The locking element according to claim 25, wherein the latch of the locking element comprises a cantilever beam.

28. A hearing device housing comprising the locking element and the housing part of claim 25.

* * * * *